US012735353B2

(12) United States Patent
Shiao et al.

(10) Patent No.: US 12,735,353 B2
(45) Date of Patent: Sep. 15, 2026

(54) CONTROLLED PARTICLE DEPOSITION FOR A ROOFING SHINGLE

(71) Applicant: BMIC LLC, Dallas, TX (US)

(72) Inventors: Ming-Liang Shiao, Collegeville, PA (US); Brian Lee, Cranford, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 18/301,509

(22) Filed: Apr. 17, 2023

(65) Prior Publication Data

US 2023/0331628 A1 Oct. 19, 2023

Related U.S. Application Data

(60) Provisional application No. 63/332,013, filed on Apr. 18, 2022.

(51) Int. Cl.

| | |
|---|---|
| ***C03C 25/1095*** | (2018.01) |
| ***C03C 25/24*** | (2018.01) |
| ***C03C 25/47*** | (2018.01) |
| ***E04D 1/20*** | (2006.01) |
| *E04D 1/00* | (2006.01) |
| *E04D 1/26* | (2006.01) |

(52) U.S. Cl.

CPC .......... *C03C 25/1095* (2013.01); *C03C 25/24* (2013.01); *C03C 25/47* (2018.01); *E04D 1/20* (2013.01); *E04D 2001/005* (2013.01); *E04D 1/26* (2013.01)

(58) Field of Classification Search

None

See application file for complete search history.

(56) References Cited

U.S. PATENT DOCUMENTS

| | | | | |
|---|---|---|---|---|
| 2,371,605 A * | 3/1945 | Carlton | ................ | B24D 11/005 427/482 |
| 2,905,569 A * | 9/1959 | Zitke | ........................ | B05D 1/12 118/301 |
| 5,795,622 A * | 8/1998 | Belt | .......................... | E04D 1/26 427/187 |
| 11,352,792 B2 * | 6/2022 | Boss | ....................... | E04D 1/365 |

(Continued)

OTHER PUBLICATIONS

"Particle" Merriam-Webster.com Dictionary, Merriam-Webster, https://www.merriam-webster.com/dictionary/particle. ( archive version from Mar. 3, 2021) (Year: 2021).*

(Continued)

*Primary Examiner* — Jose I Hernandez-Kenney

(74) *Attorney, Agent, or Firm* — GREENBERG TRAURIG, LLP

(57) ABSTRACT

A method includes obtaining a glass mat having a first side and a second side opposite the first side. The method includes coating the first side of the glass mat with a molten asphalt. The method includes obtaining a plurality of particles. The method further includes depositing the particles on the first side of the asphalt coated substrate. The depositing includes controlling a location of the plurality of particles on the first side of the asphalt coated substrate using an electrostatic generator, an electromagnetic generator, or a piezoelectric depositor. The method further includes forming a roofing shingle from the asphalt coated substrate having the plurality of particles as deposited.

3 Claims, 4 Drawing Sheets

(56) References Cited

U.S. PATENT DOCUMENTS

| | | | | |
|---|---|---|---|---|
| 2013/0034697 | A1* | 2/2013 | Shiao | B32B 27/38 427/466 |
| 2013/0202852 | A1* | 8/2013 | Shiao | E04D 5/12 428/150 |
| 2016/0222665 | A1 | 8/2016 | Belt et al. | |
| 2021/0180325 | A1* | 6/2021 | Simon | B32B 3/04 |
| 2022/0298793 | A1 | 9/2022 | Boss et al. | |

OTHER PUBLICATIONS

"Granule" Merriam-Webster.com Dictionary, Merriam-Webster, https://www.merriam-webster.com/dictionary/granule (archive version from May 17, 2021) (Year: 2021).*

* cited by examiner

100
L2
L1
102
110
W1
W2
106
124
104

CONTROLLED PARTICLE DEPOSITION FOR A ROOFING SHINGLE

RELATED APPLICATIONS

This application claims priority to U.S. Provisional Application No. 63/332,013, filed on Apr. 18, 2022, and titled "CONTROLLED PARTICLE DEPOSITION FOR A ROOFING SHINGLE," the entire contents of which are hereby incorporated by reference.

FIELD

This disclosure relates generally to a roofing shingle. More particularly, this disclosure relates to controlled deposition of particles onto a roofing shingle.

BACKGROUND

Roofing shingles generally include a fiberglass or felt mat coated and impregnated with an asphalt-based composition that is subsequently coated with granules.

SUMMARY

In some embodiments, a method includes obtaining a glass mat having a first side and a second side opposite the first side. In some embodiments, the method includes coating the first side of the glass mat with a molten asphalt. In some embodiments, the method includes obtaining a plurality of particles. In some embodiments, the method includes depositing the particles on the first side of the asphalt coated substrate. In some embodiments, the depositing includes controlling a location of the plurality of particles on the first side of the asphalt coated substrate using an electrostatic generator. In some embodiments, the method includes forming a roofing shingle from the asphalt coated substrate having the plurality of particles as deposited.

In some embodiments, a method includes obtaining a glass mat having a first side and a second side opposite the first side. In some embodiments, the method includes coating the first side of the glass mat with a molten asphalt. In some embodiments, the method includes obtaining a plurality of particles. In some embodiments, the method includes depositing the particles on the first side of the asphalt coated substrate. In some embodiments, the depositing includes controlling a location of the plurality of particles on the first side of the asphalt coated substrate using an electromagnetic generator. In some embodiments, the method includes forming a roofing shingle from the asphalt coated substrate having the plurality of particles as deposited.

In some embodiments, a method includes obtaining a glass mat having a first side and a second side opposite the first side. In some embodiments, the method includes coating the first side of the glass mat with a molten asphalt. In some embodiments, the method includes obtaining a plurality of particles. In some embodiments, the method includes depositing the particles on the first side of the asphalt coated substrate. In some embodiments, the depositing includes controlling a location of the plurality of particles on the first side of the asphalt coated substrate using a piezoelectric depositor. In some embodiments, the method includes forming a roofing shingle from the asphalt coated substrate having the plurality of particles as deposited.

In some embodiments, the roofing shingle includes a nail zone, wherein the location is within the nail zone, the nail zone having a selected dimension.

In some embodiments, the depositing and the controlling are performed concomitantly.

In some embodiments, the particles include mineral particles, polymeric particles, or any combination thereof.

In some embodiments, the first side is a top side of the glass mat, wherein the plurality of particles is deposited via gravity on a top surface of the top side of the glass mat.

In some embodiments, the first side is a bottom side of the glass mat, wherein the plurality of particles is deposited onto a bottom surface of the bottom side of the glass mat.

In some embodiments, the particles are deposited via gravity on a top surface of the glass mat.

In some embodiments, the particles are deposited onto a bottom surface of the glass mat.

In some embodiments, the method includes depositing a plurality of granules on the first side of the asphalt coated substrate using a gravity feed.

In some embodiments, the plurality of granules is deposited on the first side of the asphalt coated substrate after the particles are deposited on the first side of the asphalt coated substrate In some embodiments, the particles have a particle size distribution of 16 mesh to 270 mesh.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

Embodiments of this disclosure relate to controlled deposition of particles on a roofing shingle. In some embodiments, the result can be improved aesthetics or a particular color pattern on the roofing shingle. In some embodiments, the controlled deposition can improve a demarcation of a nail zone or other region of the roofing shingle. In some embodiments, the controlled deposition can provide for adding reflective particles to improve a total solar reflectance of the roofing shingle.

Figures 1, 2:
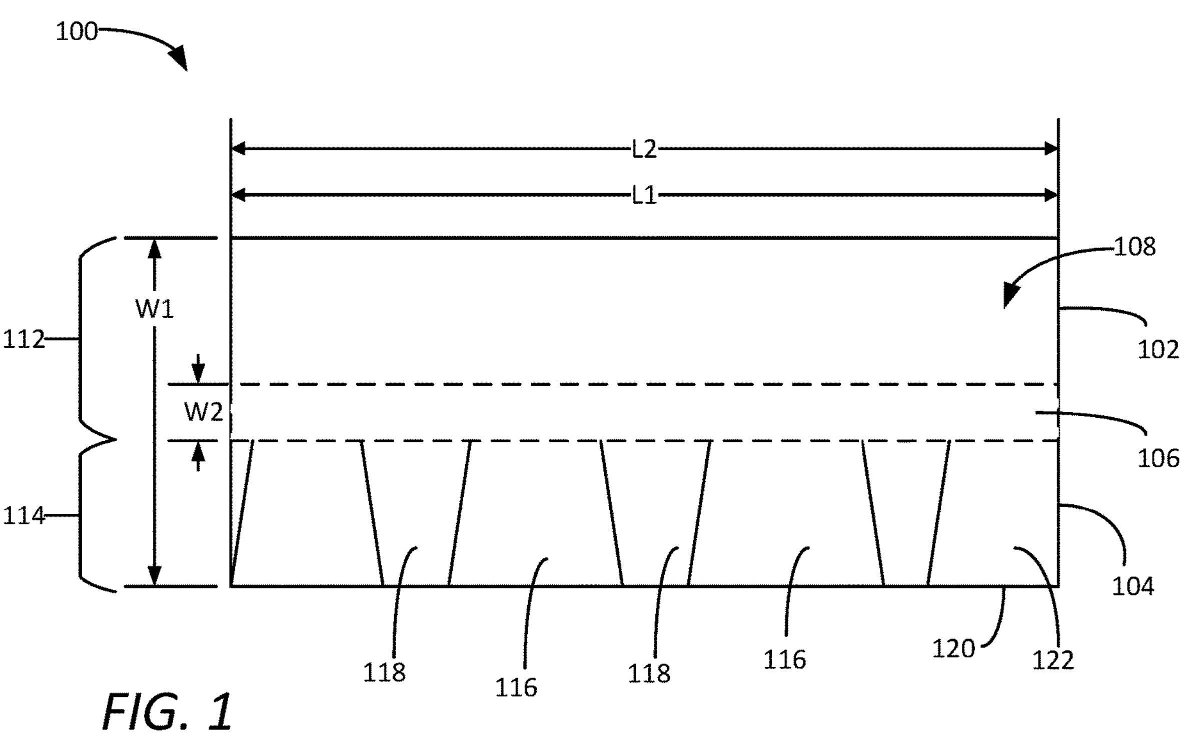
FIG. 1 shows a top view of a roofing shingle with a nail zone, to some embodiments.
FIG. 2 shows a bottom view of the roofing shingle of FIG. 1, according to some embodiments.

FIG. 1 shows a top view of a roofing shingle 100, according to some embodiments. FIG. 2 shows a bottom view of the roofing shingle 100 of FIG. 1, according to some embodiments.

With reference to FIGS. 1-2 collectively, in the illustrated embodiment, the roofing shingle 100 is a multilayered roofing shingle. In some embodiments, the multilayered roofing shingle is a two-layered roofing shingle. It is to be appreciated that the roofing shingle 100 can be a multilayered roofing shingle that includes more than two layers.

The roofing shingle 100 includes a first layer 102 and a second layer 104. In some embodiments, the first layer can 102 can be referred to as a top layer and the second layer 104 can be referred to as a bottom layer. In some embodiments, the first layer 102 can be a dragon tooth layer. In some embodiments, the second layer 104 can be a backer layer.

The roofing shingle 100 can include a nail zone 106. In some embodiments, the nail zone 106 can be referred to as a fines stripe, or the like. In some embodiments, the nail zone 106 can demarcate an area of the roofing shingle 100 which an installer (e.g., a roofer or the like) nails the roofing shingle 100 to a roof of a building during an installation of the roofing shingle 100. In some embodiments, the nail zone 106 can be configured to align with a sealant on a backside of a roofing shingle placed on top of the roofing shingle 100 during installation to a roof of a building.

The first layer 102 includes a front surface 108 and a back surface 110. The roofing shingle 100 further includes a headlap portion 112 and a buttlap portion 114. The buttlap portion 114 includes a series of cut-outs 116 leaving a plurality of tabs 118. An edge 120 of the buttlap portion 114 will be the lowermost or bottom edge of the roofing shingle 100 when installed onto a roof. Attached and/or laminated to the back surface 110 of the roofing shingle 100 is a backer strip 122. As shown in FIG. 1, the upper surface of the backer strip 122 is visible between the tabs 118 of the buttlap portion 114 of the first layer 102 of the roofing shingle 100.

In some embodiments, the roofing shingle 100 can include a major dimension L1 and a minor dimension W1.

In some embodiments, the backer strip 122 is attached to the back surface 110 of the roofing shingle 100 in a region of the nail zone 106. In some embodiments, the attachment can be via a plurality of indentations 124. In some embodiments, the attachment can additionally or alternatively include an adhesive or the like. It is to be appreciated that a number and spacing of the indentations 124 is an example and that the actual number and spacing can vary beyond the illustrated embodiment. In some embodiments, the backer strip 122 is attached to the back surface 110 of the roofing shingle 100 with an adhesive and with few to no indentations. In some embodiments, a line of sealant can be provided along a lower edge of the backer strip 122. This line of sealant is configured to attach the roofing shingle 100 to a nail zone (e.g., nail zone 106 of FIG. 1) of a previously installed roofing material. In some embodiments, the line of sealant can include a plurality of spaced apart applications of sealant. In some embodiments, the sealant could also be provided as a single line of sealant, multiple lines of sealant, or combinations thereof.

In some embodiments, the nail zone 106 is disposed on the front surface 108 of the roofing shingle 100 in an area in which the headlap portion 112 meets the buttlap portion 114. In some embodiments, the nail zone 106 is disposed on the front surface 108 of the roofing shingle 100 in an area in which the nail zone 106 will directly contact a sealant(s) of a roofing shingle that is placed immediately above the roofing shingle 100 during installation on a roof. The nail zone 106 further includes particles 126. In some embodiments, the particles 126 can be disposed at a certain average surface coverage (e.g., 30% to 70%). In some embodiments, the nail zone has an average surface coverage of the particles of 30% to 75%. In some embodiments, the nail zone has an average surface coverage of the particles of 30% to 70%. In some embodiments, the nail zone has an average surface coverage of the particles of 30% to 65%. In some embodiments, the nail zone has an average surface coverage of the particles of 30% to 60%. In some embodiments, the nail zone has an average surface coverage of the particles of 30% to 55%. In some embodiments, the nail zone has an average surface coverage of the particles of 30% to 50%. In some embodiments, the nail zone has an average surface coverage of the particles of 30% to 45%. In some embodiments, the nail zone has an average surface coverage of the particles of 30% to 40%. In some embodiments, the nail zone has an average surface coverage of the particles of 30% to 35%. In some embodiments, the nail zone has an average surface coverage of the particles of 35% to 75%. In some embodiments, the nail zone has an average surface coverage of the particles of 35% to 70%. In some embodiments, the nail zone has an average surface coverage of the particles of 35% to 65%. In some embodiments, the nail zone has an average surface coverage of the particles of 35% to 60%. In some embodiments, the nail zone has an average surface coverage of the particles of 35% to 55%. In some embodiments, the nail zone has an average surface coverage of the particles of 35% to 50%. In some embodiments, the nail zone has an average surface coverage of the particles of 35% to 45%. In some embodiments, the nail zone has an average surface coverage of the particles of 35% to 40%. In some embodiments, the nail zone has an average surface coverage of the particles of 40% to 75%. In some embodiments, the nail zone has an average surface coverage of the particles of 40% to 70%. In some embodiments, the nail zone has an average surface coverage of the particles of 40% to 65%. In some embodiments, the nail zone has an average surface coverage of the particles of 40% to 60%. In some embodiments, the nail zone has an average surface coverage of the particles of 40% to 55%. In some embodiments, the nail zone has an average surface coverage of the particles of 40% to 50%. In some embodiments, the nail zone has an average surface coverage of the particles of 40% to 45%. In some embodiments, the nail zone has an average surface coverage of the particles of 45% to 75%. In some embodiments, the nail zone has an average surface coverage of the particles of 45% to 70%. In some embodiments, the nail zone has an average surface coverage of the particles of 45% to 65%. In some embodiments, the nail zone has an average surface coverage of the particles of 45% to 60%. In some embodiments, the nail zone has an average surface coverage of the particles of 45% to 55%. In some embodiments, the nail zone has an average surface coverage of the particles of 45% to 50%. In some embodiments, the nail zone has an average surface coverage of the particles of 50% to 75%. In some embodiments, the nail zone has an average surface coverage of the particles of 50% to 70%. In some embodiments, the nail zone has an average surface coverage of the particles of 50% to 65%. In some embodiments, the nail zone has an average surface coverage of the particles of 50% to 60%. In some embodiments, the nail zone has an average surface coverage of the particles of 50% to 55%. In some embodiments, the nail zone has an average surface coverage of the particles of 55% to 75%. In some embodiments, the nail zone has an average surface coverage of the particles of 55% to 70%. In some embodiments, the nail zone has an average surface coverage of the particles of 55% to 65%. In some embodiments, the nail zone has an average surface coverage of the particles of 55% to 60%. In some embodiments, the nail zone has an average surface coverage of the particles of 60% to 75%. In some embodiments, the nail zone has an average surface coverage of the particles of 60% to 70%. In some embodiments, the nail zone has an average surface coverage of the particles of 60% to 65%. In some embodiments, the nail zone has an average surface coverage of the particles of 65% to 75%. In some embodiments, the nail zone has an average surface coverage of the particles of 65% to 70%. In some embodiments, the nail zone has an average surface coverage of the particles of 70% to 75%.

In some embodiments, the nail zone 106 can include a major dimension L2 and a minor dimension W2. In some embodiments, the major dimension L1 of the roofing shingle 100 and the major dimension L2 of the nail zone 106 can be the same. That is, in some embodiments, the nail zone 106 can extend across an entire major dimension L1 of the roofing shingle 100. In some embodiments, the minor dimension W2 of the nail zone 106 can be controlled using, for example, a controlled deposition method including an electrostatic generator, an electromagnetic generator, a piezoelectric depositor, or the like. In some embodiments, the dimensions of the nail zone 106 can be controlled to a particular dimension based on, for example, aesthetics and operating parameters such as, but not limited to, wind uplift resistance or the like.

In some embodiments, the particles include mineral particles that include at least one of slag fines, granule fines, sands, limestone fines, calcium carbonate, slate fines, or combinations thereof. In some embodiments, the particles include various minerals and/or materials extracted from a quarry, including, for example, various types of granite, basalt, clay, coal, gypsum, limestone, marble, quartz, rhyolite, sandstone, quartz, among others, or combinations thereof.

In some embodiments, the particles include polymeric particles that include at least one of rubber particles, linear low-density polyethylene (LLDPE) particles, styrene-butadiene-styrene (SBS) powders, particles having a polar functional group that is selected from the group consisting of an alcohol, a carboxyl, a phenolic, an amine, and a thiol, and combinations thereof. In some embodiments, the particles include activated rubber particles from reclaimed tire. In some embodiments, the particles include recycled asphalt, such as, e.g., recycled asphaltic shingles. According to some embodiments, the particles have a high affinity for a sealant, including, e.g., an asphaltic sealant.

In some embodiments, the particles include glass.

In some embodiments, the particles include nickel, copper, iron, titanium, and/or zinc, as well as any other metal, and combinations thereof.

In some embodiments, the particles are reflective. In some embodiments, the particles include graphene powder.

In some embodiments, the particles further include granules. In some embodiments, the particles are free of granules. In some embodiments, the granules can have a mean particle size of 300 μm to 2,000 μm. In some embodiments, the granules can have a mean particle size of 500 μm to 2,000 μm. In some embodiments, the granules can have a mean particle size of 1,000 μm to 2,000 μm. In some embodiments, the granules can have a mean particle size of 1,500 μm to 2,000 μm.

In some embodiments, the particles have a particle size distribution of 16 to 270 US mesh. In some embodiments, the particles have a particle size distribution of 16 to 250 US mesh. In some embodiments, the particles have a particle size distribution of 16 to 225 US mesh. In some embodiments, the particles have a particle size distribution of 16 to 200 US mesh. In some embodiments, the particles have a particle size distribution of 16 to 175 US mesh. In some embodiments, the particles have a particle size distribution of 16 to 150 US mesh. In some embodiments, the particles have a particle size distribution of 16 to 125 US mesh. In some embodiments, the particles have a particle size distribution of 16 to 100 US mesh. In some embodiments, the particles have a particle size distribution of 16 to 75 US mesh. In some embodiments, the particles have a particle size distribution of 16 to 50 US mesh. In some embodiments, the particles have a particle size distribution of 16 to 40 US mesh. In some embodiments, the particles have a particle size distribution of 16 to 30 US mesh. In some embodiments, the particles have a particle size distribution of 16 to 25 US mesh. In some embodiments, the particles have a particle size distribution of 16 to 20 US mesh. In some embodiments, the particles have a particle size distribution of 20 to 270 US mesh. In some embodiments, the particles have a particle size distribution of 20 to 250 US mesh. In some embodiments, the particles have a particle size distribution of 20 to 225 US mesh. In some embodiments, the particles have a particle size distribution of 20 to 200 US mesh. In some embodiments, the particles have a particle size distribution of 20 to 175 US mesh. In some embodiments, the particles have a particle size distribution of 20 to 150 US mesh. In some embodiments, the particles have a particle size distribution of 20 to 125 US mesh. In some embodiments, the particles have a particle size distribution of 20 to 100 US mesh. In some embodiments, the particles have a particle size distribution of 20 to 75 US mesh. In some embodiments, the particles have a particle size distribution of 20 to 50 US mesh. In some embodiments, the particles have a particle size distribution of 20 to 40 US mesh. In some embodiments, the particles have a particle size distribution of 20 to 30 US mesh. In some embodiments, the particles have a particle size distribution of 20 to 25 US mesh. In some embodiments, the particles have a particle size distribution of 25 to 270 US mesh. In some embodiments, the particles have a particle size distribution of 25 to 250 US mesh. In some embodiments, the particles have a particle size distribution of 25 to 225 US mesh. In some embodiments, the particles have a particle size distribution of 25 to 200 US mesh. In some embodiments, the particles have a particle size distribution of 25 to 175 US mesh. In some embodiments, the particles have a particle size distribution of 25 to 150 US mesh. In some embodiments, the particles have a particle size distribution of 25 to 125 US mesh. In some embodiments, the particles have a particle size distribution of 25 to 100 US mesh. In some embodiments, the particles have a particle size distribution of 25 to 75 US mesh. In some embodiments, the particles have a particle size distribution of 25 to 50 US mesh. In some embodiments, the particles have a particle size distribution of 25 to 40 US mesh. In some embodiments, the particles have a particle size distribution of 25 to 30 US mesh. In some embodiments, the particles have a particle size distribution of 30 to 270 US mesh. In some embodiments, the particles have a particle size distribution of 30 to 250 US mesh. In some embodiments, the particles have a particle size distribution of 30 to 225 US mesh. In some embodiments, the particles have a particle size distribution of 30 to 200 US mesh. In some embodiments, the particles have a particle size distribution of 30 to 175 US mesh. In some embodiments, the particles have a particle size distribution of 30 to 150 US mesh. In some embodiments, the particles have a particle size distribution of 30 to 125 US mesh. In some embodiments, the particles have a particle size distribution of 30 to 100 US mesh. In some embodiments, the particles have a particle size distribution of 30 to 75 US mesh. In some embodiments, the particles have a particle size distribution of 30 to 50 US mesh. In some embodiments, the particles have a particle size distribution of 30 to 40 US mesh. In some embodiments, the particles have a particle size distribution of 40 to 270 US mesh. In some embodiments, the particles have a particle size distribution of 40 to 250 US mesh. In some embodiments, the particles have a particle size distribution of 40 to 225 US mesh. In some embodiments, the particles have a particle size distribution of 40 to 200 US mesh. In some embodiments, the particles have a particle size distribution of 40 to 175 US mesh. In some embodiments, the particles have a particle size distribution of 40 to 150 US mesh. In some embodiments, the particles have a particle size distribution of 40 to 125 US mesh. In some embodiments, the particles have a particle size distribution of 40 to 100 US mesh. In some embodiments, the particles have a particle size distribution of 40 to 75 US mesh. In some embodiments, the particles have a particle size distribution of 40 to 50 US mesh. In some embodiments, the particles have a particle size distribution of 50 to 270 US mesh. In some embodiments, the particles have a particle size distribution of 50 to 250 US mesh. In some embodiments, the particles have a particle size distribution of 50 to 225 US mesh. In some embodiments, the particles have a particle size distribution of 50 to 200 US mesh. In some embodiments, the particles have a particle size distribution of 50 to 175 US mesh. In some embodiments, the particles have a particle size distribution of 50 to 150 US mesh. In some embodiments, the particles have a particle size distribution of 50 to 125 US mesh. In some embodiments, the particles have a particle size distribution of 50 to 100 US mesh. In some embodiments, the particles have a particle size distribution of 50 to 75 US mesh. In some embodiments, the particles have a particle size distribution of 75 to 270 US mesh. In some embodiments, the particles have a particle size distribution of 75 to 250 US mesh. In some embodiments, the particles have a particle size distribution of 75 to 225 US mesh. In some embodiments, the particles have a particle size distribution of 75 to 200 US mesh. In some embodiments, the particles have a particle size distribution of 75 to 175 US mesh. In some embodiments, the particles have a particle size distribution of 75 to 150 US mesh. In some embodiments, the particles have a particle size distribution of 75 to 125 US mesh. In some embodiments, the particles have a particle size distribution of 75 to 100 US mesh. In some embodiments, the particles have a particle size distribution of 100 to 270 US mesh. In some embodiments, the particles have a particle size distribution of 100 to 250 US mesh. In some embodiments, the particles have a particle size distribution of 100 to 225 US mesh. In some embodiments, the particles have a particle size distribution of 100 to 200 US mesh. In some embodiments, the particles have a particle size distribution of 100 to 175 US mesh. In some embodiments, the particles have a particle size distribution of 100 to 150 US mesh. In some embodiments, the particles have a particle size distribution of 100 to 125 US mesh. In some embodiments, the particles have a particle size distribution of 125 to 270 US mesh. In some embodiments, the particles have a particle size distribution of 125 to 250 US mesh. In some embodiments, the particles have a particle size distribution of 125 to 225 US mesh. In some embodiments, the particles have a particle size distribution of 125 to 200 US mesh. In some embodiments, the particles have a particle size distribution of 125 to 175 US mesh. In some embodiments, the particles have a particle size distribution of 125 to 150 US mesh. In some embodiments, the particles have a particle size distribution of 150 to 270 US mesh. In some embodiments, the particles have a particle size distribution of 150 to 250 US mesh. In some embodiments, the particles have a particle size distribution of 150 to 225 US mesh. In some embodiments, the particles have a particle size distribution of 150 to 200 US mesh. In some embodiments, the particles have a particle size distribution of 150 to 175 US mesh. In some embodiments, the particles have a particle size distribution of 175 to 270 US mesh. In some embodiments, the particles have a particle size distribution of 175 to 250 US mesh. In some embodiments, the particles have a particle size distribution of 175 to 225 US mesh. In some embodiments, the particles have a particle size distribution of 175 to 200 US mesh. In some embodiments, the particles have a particle size distribution of 200 to 270 US mesh. In some embodiments, the particles have a particle size distribution of 200 to 250 US mesh. In some embodiments, the particles have a particle size distribution of 200 to 225 US mesh. In some embodiments, the particles have a particle size distribution of 225 to 270 US mesh. In some embodiments, the particles have a particle size distribution of 225 to 250 US mesh. In some embodiments, the particles have a particle size distribution of 250 to 270 US mesh.

In some embodiments, the particles have a mean particle size of 100 to 250 microns. In some embodiments, the particles have a mean particle size of 100 to 225 microns. In some embodiments, the particles have a mean particle size of 100 to 200 microns. In some embodiments, the particles have a mean particle size of 100 to 175 microns. In some embodiments, the particles have a mean particle size of 100 to 150 microns. In some embodiments, the particles have a mean particle size of 100 to 125 microns. In some embodiments, the particles have a mean particle size of 125 to 250 microns. In some embodiments, the particles have a mean particle size of 125 to 225 microns. In some embodiments, the particles have a mean particle size of 125 to 200 microns. In some embodiments, the particles have a mean particle size of 125 to 175 microns. In some embodiments, the particles have a mean particle size of 125 to 150 microns. In some embodiments, the particles have a mean particle size of 150 to 250 microns. In some embodiments, the particles have a mean particle size of 150 to 225 microns. In some embodiments, the particles have a mean particle size of 150 to 200 microns. In some embodiments, the particles have a mean particle size of 150 to 175 microns. In some embodiments, the particles have a mean particle size of 175 to 250 microns. In some embodiments, the particles have a mean particle size of 175 to 225 microns. In some embodiments, the particles have a mean particle size of 175 to 200 microns. In some embodiments, the particles have a mean particle size of 200 to 250 microns. In some embodiments, the particles have a mean particle size of 200 to 225 microns. In some embodiments, the particles have a mean particle size of 225 to 250 microns.

Figure 3:
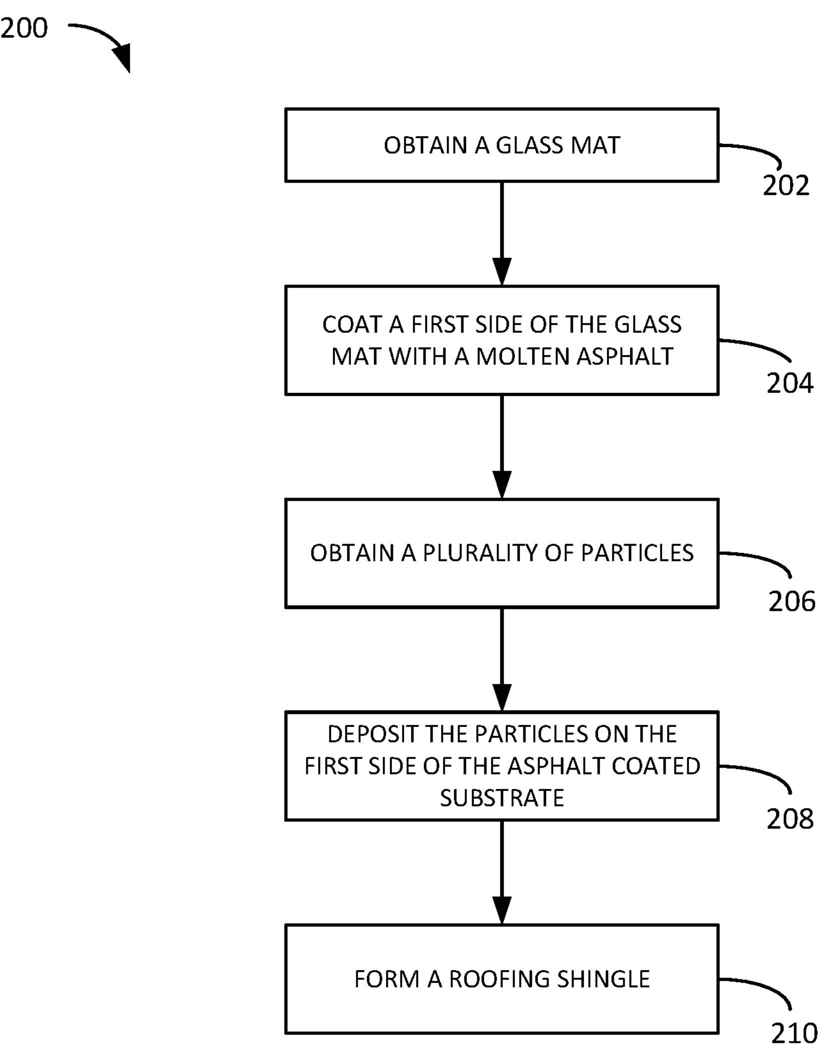
FIG. 3 shows a method for forming a roofing shingle with selective deposition of particles on a surface of the roofing shingle, according to some embodiments.

FIG. 3 shows a method 200 for forming a roofing shingle with selective deposition of particles on a surface of the roofing shingle, according to some embodiments. In some embodiments, the method 200 can be used to form a roofing shingle such as the roofing shingle 100 of FIGS. 1-2.

At block 202, the method 200 includes obtaining a glass mat having a first side and a second side opposite the first side.

At block 204, the method 200 includes coating the first side of the glass mat with a molten asphalt. In some embodiments, block 204 can additionally include coating the second side of the glass mat with the molten asphalt.

At block 206, the method 200 includes obtaining a plurality of particles. In some embodiments, the plurality of particles can be provided in a particle silo or the like.

At block 208, the method 200 includes depositing the particles on the first side of the asphalt coated substrate. In some embodiments, the depositing includes controlling a location of the plurality of particles on the first side of the asphalt coated substrate. In some embodiments, the depositing and the controlling are performed concomitantly.

In some embodiments, the particles can be deposited via gravity onto the first side of the glass mat. In some embodiments, the particles can be deposited on the first side of the asphalt coated substrate by levitating the particles towards the first side of the asphalt coated substrate and forcing the particles to be deposited on the first side of the asphalt coated substrate from an underside of the asphalt coated substrate. In some embodiments, by applying the particles from an underside of the asphalt coated substrate can result in the desired particles being applied to the first side of the sheet. In some embodiments, the applying from the underside can reduce a chance of applying too many particles due to overapplication from a gravity feed. In some embodiments, the depositing includes controlling a location of the plurality of particles on the first side of the asphalt coated substrate.

In some embodiments, controlling the location of the plurality of particles on the first side of the asphalt coated substrate can include depositing the particles within a particular location of the asphalt coated substrate. For example, in some embodiments, the particular location can include a nail zone of the subsequently formed roofing shingle. In some embodiments, this can include forming the nail zone to have a selected dimension. For example, the nail zone can be controlled to have a selected minor dimension D1 from edge to edge and a selected major dimension D2. In some embodiments, the major dimension D2 can be the same as the major dimension of the roofing shingle. In some embodiments, the major dimension D2 can be smaller than the major dimension of the roofing shingle.

In some embodiments, the particular location can be selected to improve a wind uplift resistance of the subsequently formed roofing shingle. In some embodiments, the particular location can improve an adhesion with sealants of other roofing shingles when the subsequently formed roofing shingle is installed on a roof. In some embodiments, the particular location can be selected to reduce a surface tack temperature of the subsequently formed roofing shingle. In some embodiments, the particular location can be selected to provide a different aesthetic. For example, in some embodiments, the particular location can be selected to provide an aesthetic feature such as, but not limited to, a logo, product name, manufacturer name, or the like, so that the product or its manufacturer is readily identifiable. In some embodiments, the particular location can be within areas not covered by granules to, for example, improve a resistance to ultraviolet (UV) rays.

In some embodiments, controlling a location of the plurality of particles on the first side of the asphalt coated substrate can include controlling an amount of coverage of the particles within a given area. For example, in some embodiments, controlling the amount of coverage of the particles can be such that the coverage within a particular area, such as but not limited to, the nail zone, is within a selected coverage amount.

In some embodiments, the nail zone has an average surface coverage of the particles of 30% to 75%. In some embodiments, the nail zone has an average surface coverage of the particles of 30% to 70%. In some embodiments, the nail zone has an average surface coverage of the particles of 30% to 65%. In some embodiments, the nail zone has an average surface coverage of the particles of 30% to 60%. In some embodiments, the nail zone has an average surface coverage of the particles of 30% to 55%. In some embodiments, the nail zone has an average surface coverage of the particles of 30% to 50%. In some embodiments, the nail zone has an average surface coverage of the particles of 30% to 45%. In some embodiments, the nail zone has an average surface coverage of the particles of 30% to 40%. In some embodiments, the nail zone has an average surface coverage of the particles of 30% to 35%. In some embodiments, the nail zone has an average surface coverage of the particles of 35% to 75%. In some embodiments, the nail zone has an average surface coverage of the particles of 35% to 70%. In some embodiments, the nail zone has an average surface coverage of the particles of 35% to 65%. In some embodiments, the nail zone has an average surface coverage of the particles of 35% to 60%. In some embodiments, the nail zone has an average surface coverage of the particles of 35% to 55%. In some embodiments, the nail zone has an average surface coverage of the particles of 35% to 50%. In some embodiments, the nail zone has an average surface coverage of the particles of 35% to 45%. In some embodiments, the nail zone has an average surface coverage of the particles of 35% to 40%. In some embodiments, the nail zone has an average surface coverage of the particles of 40% to 75%. In some embodiments, the nail zone has an average surface coverage of the particles of 40% to 70%. In some embodiments, the nail zone has an average surface coverage of the particles of 40% to 65%. In some embodiments, the nail zone has an average surface coverage of the particles of 40% to 60%. In some embodiments, the nail zone has an average surface coverage of the particles of 40% to 55%. In some embodiments, the nail zone has an average surface coverage of the particles of 40% to 50%. In some embodiments, the nail zone has an average surface coverage of the particles of 40% to 45%. In some embodiments, the nail zone has an average surface coverage of the particles of 45% to 75%. In some embodiments, the nail zone has an average surface coverage of the particles of 45% to 70%. In some embodiments, the nail zone has an average surface coverage of the particles of 45% to 65%. In some embodiments, the nail zone has an average surface coverage of the particles of 45% to 60%. In some embodiments, the nail zone has an average surface coverage of the particles of 45% to 55%. In some embodiments, the nail zone has an average surface coverage of the particles of 45% to 50%. In some embodiments, the nail zone has an average surface coverage of the particles of 50% to 75%. In some embodiments, the nail zone has an average surface coverage of the particles of 50% to 70%. In some embodiments, the nail zone has an average surface coverage of the particles of 50% to 65%. In some embodiments, the nail zone has an average surface coverage of the particles of 50% to 60%. In some embodiments, the nail zone has an average surface coverage of the particles of 50% to 55%. In some embodiments, the nail zone has an average surface coverage of the particles of 55% to 75%. In some embodiments, the nail zone has an average surface coverage of the particles of 55% to 70%. In some embodiments, the nail zone has an average surface coverage of the particles of 55% to 65%. In some embodiments, the nail zone has an average surface coverage of the particles of 55% to 60%. In some embodiments, the nail zone has an average surface coverage of the particles of 60% to 75%. In some embodiments, the nail zone has an average surface coverage of the particles of 60% to 70%. In some embodiments, the nail zone has an average surface coverage of the particles of 60% to 65%. In some embodiments, the nail zone has an average surface coverage of the particles of 65% to 75%. In some embodiments, the nail zone has an average surface coverage of the particles of 65% to 70%. In some embodiments, the nail zone has an average surface coverage of the particles of 70% to 75%.

In some embodiments, controlling a location of the plurality of particles on the first side of the asphalt coated substrate can include controlling a particle density of the particles within a given area. For example, a density of the particles within the nail zone can be controlled to a selected density.

In some embodiments, an electrostatic generator is used at block 208 to control the location of the particles. In some embodiments, the electrostatic generator can be controlled to provide control for patterning of the particles. In some embodiments, a template such as, but not limited to, a metal plate or the like, can be used to provide a template for patterning of the particles.

In some embodiments, an electromagnetic generator is used at block 208 to control the location of the particles. In some embodiments, the electromagnetic generator can be controlled to provide control for patterning of the particles. In some embodiments, a template such as, but not limited to, a metal plate or the like, can be used to provide a template for patterning of the particles.

In some embodiments, a piezoelectric depositor is used at block 208 to control the location of the particles. In some embodiments, the piezoelectric depositor can be controlled to provide control for patterning of the particles. In some embodiments, a template such as, but not limited to, a metal plate or the like, can be used to provide a template for patterning of the particles.

At block 210, the method includes forming a roofing shingle from the asphalt coated substrate having the plurality of particles as deposited. Block 210 can include one or more additional steps. For example, in some embodiments, block 210 can include applying granules on one or both sides of the roofing shingle, applying a release tape, back surfacing, pressing layers of the roofing shingle together, combinations thereof, or the like.

Figure 4:
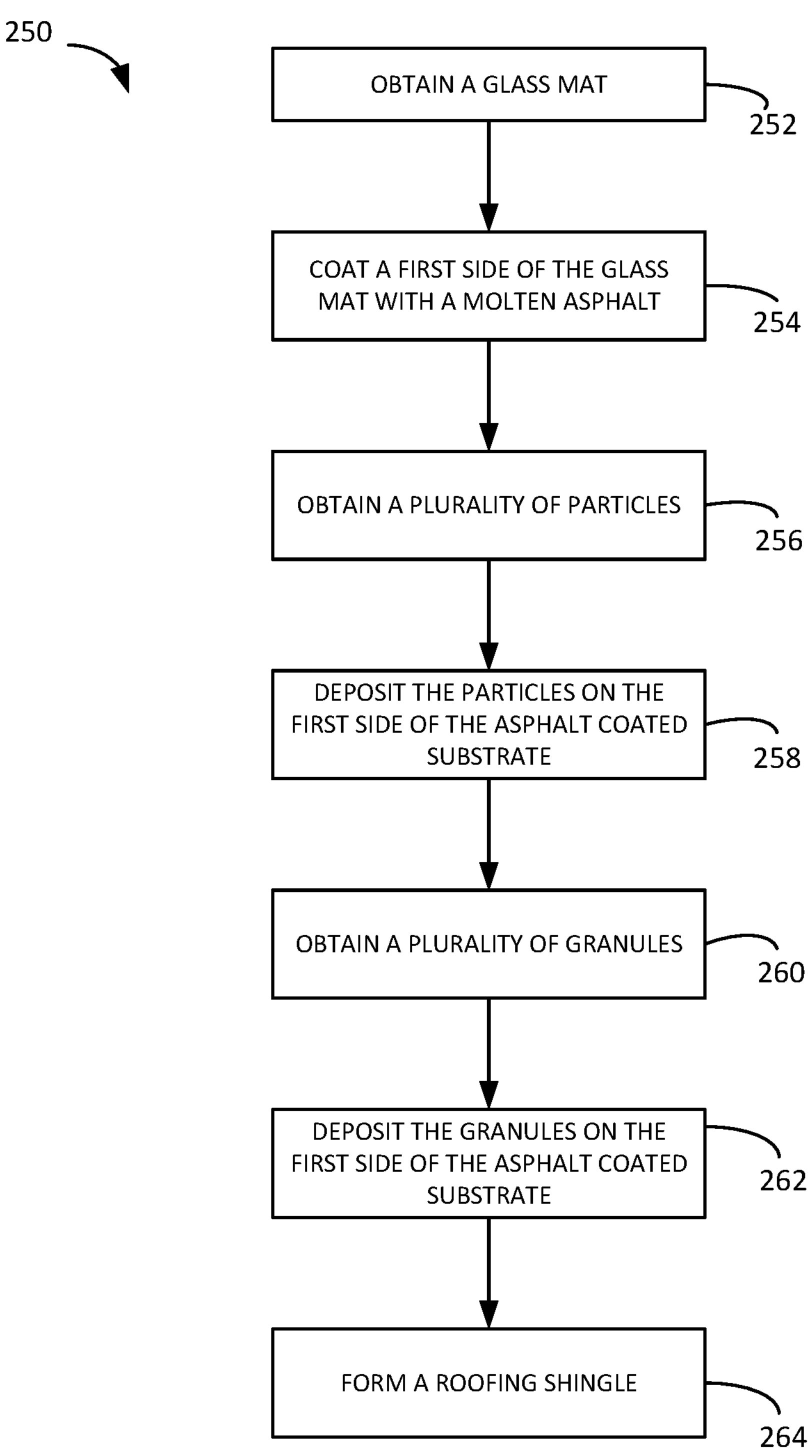
FIG. 4 shows a method for forming a roofing shingle with selective deposition of particles on a surface of the roofing shingle, according to some embodiments.

FIG. 4 shows a method 250 for forming a roofing shingle with selective deposition of particles on a surface of the roofing shingle, according to some embodiments. In some embodiments, the method 250 can be used to form a roofing shingle such as the roofing shingle 100 of FIGS. 1-2.

At block 252, the method 250 includes obtaining a glass mat having a first side and a second side opposite the first side.

At block 254, the method 250 includes coating the first side of the glass mat with a molten asphalt. In some embodiments, block 254 can additionally include coating the second side of the glass mat with the molten asphalt.

At block 256, the method 250 includes obtaining a plurality of particles.

At block 258, the method 250 includes depositing the particles on the first side of the asphalt coated substrate. In some embodiments, the particles can be deposited via gravity onto the first side of the glass mat. In some embodiments, the particles can be deposited on the first side of the asphalt coated substrate by levitating the particles towards the first side of the asphalt coated substrate and forcing the particles to be deposited on the first side of the asphalt coated substrate from an underside of the asphalt coated substrate. In some embodiments, by applying the particles from an underside of the asphalt coated substrate can result in the desired particles being applied to the first side of the sheet. In some embodiments, the applying from the underside can reduce a chance of applying too many particles due to overapplication from a gravity feed. In some embodiments, the depositing includes controlling a location of the plurality of particles on the first side of the asphalt coated substrate.

In some embodiments, controlling the location of the plurality of particles on the first side of the asphalt coated substrate can include depositing the particles within a particular location of the asphalt coated substrate. For example, in some embodiments, the particular location can include a nail zone of the subsequently formed roofing shingle. In some embodiments, this can include forming the nail zone to have a selected dimension. For example, the nail zone can be controlled to have a selected minor dimension D1 from edge to edge and a selected major dimension D2. In some embodiments, the major dimension D2 can be the same as the major dimension of the roofing shingle. In some embodiments, the major dimension D2 can be smaller than the major dimension of the roofing shingle.

In some embodiments, the particular location can be selected to improve a wind uplift resistance of the subsequently formed roofing shingle. In some embodiments, the particular location can improve an adhesion with sealants of other roofing shingles when the subsequently formed roofing shingle is installed on a roof. In some embodiments, the particular location can be selected to reduce a surface tack temperature of the subsequently formed roofing shingle. In some embodiments, the particular location can be selected to provide a different aesthetic. For example, in some embodiments, the particular location can be selected to provide an aesthetic feature such as, but not limited to, a logo, product name, manufacturer name, or the like, so that the product or its manufacturer is readily identifiable. In some embodiments, the particular location can be within areas not covered by granules to, for example, improve a resistance to ultraviolet (UV) rays.

In some embodiments, controlling a location of the plurality of particles on the first side of the asphalt coated substrate can include controlling an amount of coverage of the particles within a given area. For example, in some embodiments, controlling the amount of coverage of the particles can be such that the coverage within a particular area, such as but not limited to, the nail zone, is within a selected coverage amount.

In some embodiments, the nail zone has an average surface coverage of the particles of 30% to 75%. In some embodiments, the nail zone has an average surface coverage of the particles of 30% to 70%. In some embodiments, the nail zone has an average surface coverage of the particles of 30% to 65%. In some embodiments, the nail zone has an average surface coverage of the particles of 30% to 60%. In some embodiments, the nail zone has an average surface coverage of the particles of 30% to 55%. In some embodiments, the nail zone has an average surface coverage of the particles of 30% to 50%. In some embodiments, the nail zone has an average surface coverage of the particles of 30% to 45%. In some embodiments, the nail zone has an average surface coverage of the particles of 30% to 40%. In some embodiments, the nail zone has an average surface coverage of the particles of 30% to 35%. In some embodiments, the nail zone has an average surface coverage of the particles of 35% to 75%. In some embodiments, the nail zone has an average surface coverage of the particles of 35% to 70%. In some embodiments, the nail zone has an average surface coverage of the particles of 35% to 65%. In some embodiments, the nail zone has an average surface coverage of the particles of 35% to 60%. In some embodiments, the nail zone has an average surface coverage of the particles of 35% to 55%. In some embodiments, the nail zone has an average surface coverage of the particles of 35% to 50%. In some embodiments, the nail zone has an average surface coverage of the particles of 35% to 45%. In some embodiments, the nail zone has an average surface coverage of the particles of 35% to 40%. In some embodiments, the nail zone has an average surface coverage of the particles of 40% to 75%. In some embodiments, the nail zone has an average surface coverage of the particles of 40% to 70%. In some embodiments, the nail zone has an average surface coverage of the particles of 40% to 65%. In some embodiments, the nail zone has an average surface coverage of the particles of 40% to 60%. In some embodiments, the nail zone has an average surface coverage of the particles of 40% to 55%. In some embodiments, the nail zone has an average surface coverage of the particles of 40% to 50%. In some embodiments, the nail zone has an average surface coverage of the particles of 40% to 45%. In some embodiments, the nail zone has an average surface coverage of the particles of 45% to 75%. In some embodiments, the nail zone has an average surface coverage of the particles of 45% to 70%. In some embodiments, the nail zone has an average surface coverage of the particles of 45% to 65%. In some embodiments, the nail zone has an average surface coverage of the particles of 45% to 60%. In some embodiments, the nail zone has an average surface coverage of the particles of 45% to 55%. In some embodiments, the nail zone has an average surface coverage of the particles of 45% to 50%. In some embodiments, the nail zone has an average surface coverage of the particles of 50% to 75%. In some embodiments, the nail zone has an average surface coverage of the particles of 50% to 70%. In some embodiments, the nail zone has an average surface coverage of the particles of 50% to 65%. In some embodiments, the nail zone has an average surface coverage of the particles of 50% to 60%. In some embodiments, the nail zone has an average surface coverage of the particles of 50% to 55%. In some embodiments, the nail zone has an average surface coverage of the particles of 55% to 75%. In some embodiments, the nail zone has an average surface coverage of the particles of 55% to 70%. In some embodiments, the nail zone has an average surface coverage of the particles of 55% to 65%. In some embodiments, the nail zone has an average surface coverage of the particles of 55% to 60%. In some embodiments, the nail zone has an average surface coverage of the particles of 60% to 75%. In some embodiments, the nail zone has an average surface coverage of the particles of 60% to 70%. In some embodiments, the nail zone has an average surface coverage of the particles of 60% to 65%. In some embodiments, the nail zone has an average surface coverage of the particles of 65% to 75%. In some embodiments, the nail zone has an average surface coverage of the particles of 65% to 70%. In some embodiments, the nail zone has an average surface coverage of the particles of 70% to 75%.

In some embodiments, controlling a location of the plurality of particles on the first side of the asphalt coated substrate can include controlling a particle density of the particles within a given area. For example, a density of the particles within the nail zone can be controlled to a selected density.

In some embodiments, an electrostatic generator is used at block 258 to control the location of the particles. In some embodiments, the electrostatic generator can be controlled to provide control for patterning of the particles. In some embodiments, a template such as, but not limited to, a metal plate or the like, can be used to provide a template for patterning of the particles.

In some embodiments, an electromagnetic generator is used at block 258 to control the location of the particles. In some embodiments, the electromagnetic generator can be controlled to provide control for patterning of the particles. In some embodiments, a template such as, but not limited to, a metal plate or the like, can be used to provide a template for patterning of the particles.

In some embodiments, a piezoelectric depositor is used at block 258 to control the location of the particles. In some embodiments, the piezoelectric depositor can be controlled to provide control for patterning of the particles. In some embodiments, a template such as, but not limited to, a metal plate or the like, can be used to provide a template for patterning of the particles.

At block 260, the method includes obtaining a plurality of granules. In some embodiments, the granules can be colored roofing granules.

At block 262, the method 250 includes depositing the granules on the first side of the asphalt coated substrate. In some embodiments, the depositing the granules on the first side of the asphalt coated substrate includes levitating the granules towards the first side of the asphalt coated substrate and forcing the granules to be deposited on the first side of the asphalt coated substrate. In some embodiments, by applying the granules from an underside of the asphalt coated substrate can result in the desired granules being applied to the first side of the sheet. In some embodiments, the method 250 can reduce a chance of applying too many granules due to overapplication from a gravity feed. In some embodiments, the depositing includes controlling a location of the plurality of granules on the first side of the asphalt coated substrate. In some embodiments, the depositing and the controlling are performed concomitantly.

At block 264, the method includes forming a roofing shingle from the asphalt coated substrate having the plurality of particles and the plurality of granules as deposited. Block 262 can include one or more additional steps. For example, in some embodiments, block 262 can include applying granules on a second side of the roofing shingle, applying a release tape, back surfacing, pressing layers of the roofing shingle together, combinations thereof, or the like.

Figure 5:
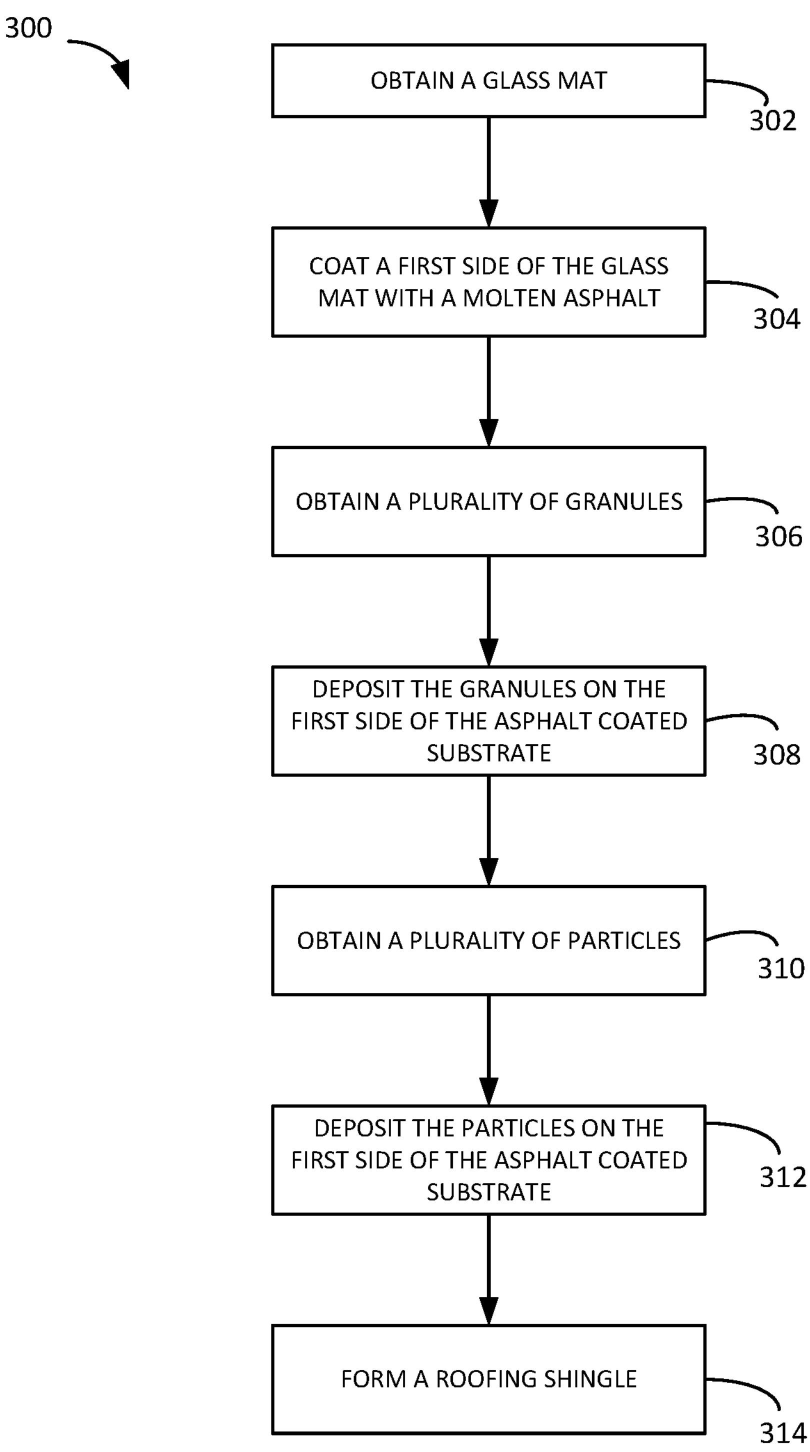
FIG. 5 shows a method for forming a roofing shingle with selective deposition of particles on a surface of the roofing shingle, according to some embodiments.

FIG. 5 shows a method 300 for forming a roofing shingle with selective deposition of particles on a surface of the roofing shingle, according to some embodiments. In some embodiments, the method 300 can be used to form a roofing shingle such as the roofing shingle 100 of FIGS. 1-2.

At block 302, the method 300 includes obtaining a glass mat having a first side and a second side opposite the first side.

At block 304, the method 300 includes coating the first side of the glass mat with a molten asphalt. In some embodiments, block 304 can additionally include coating the second side of the glass mat with the molten asphalt.

At block 306, the method 300 includes obtaining a plurality of granules. In the illustrated embodiment, the granules can be provided in a granule silo or the like. In some embodiments, the particle silo can be used to deposit the granules via gravity onto the first side of the glass mat.

At block 308, the method 300 includes depositing the granules on the first side of the glass mat.

At block 310, the method 300 includes obtaining a plurality of particles. In the illustrated embodiment, the particles can be provided in a particle silo or the like. In some embodiments, the particle silo can be used to deposit the particles via gravity onto the first side of the glass mat.

At block 312, the method 300 includes depositing the particles on the first side of the asphalt coated substrate. In some embodiments, the depositing includes controlling a location of the plurality of particles on the first side of the asphalt coated substrate. In some embodiments, the depositing and the controlling are performed concomitantly.

In some embodiments, controlling the location of the plurality of particles on the first side of the asphalt coated substrate can include depositing the particles within a particular location of the asphalt coated substrate. For example, in some embodiments, the particular location can include spaces in between the granules on the first side of the asphalt coated substrate. In some embodiments, particles not disposed in the spaces between the granules will not adhere to the first side of the asphalt coated substrate and can be collected for reuse.

In some embodiments, the particular location can be within areas not covered by granules to, for example, improve a resistance to ultraviolet (UV) rays.

In some embodiments, an electrostatic generator is used at block 132 to control the location of the particles. In some embodiments, the electrostatic generator can be controlled to provide control for patterning of the particles. In some embodiments, a template such as, but not limited to, a metal plate or the like, can be used to provide a template for patterning of the particles.

In some embodiments, an electromagnetic generator is used at block 312 to control the location of the particles. In some embodiments, the electromagnetic generator can be controlled to provide control for patterning of the particles. In some embodiments, a template such as, but not limited to, a metal plate or the like, can be used to provide a template for patterning of the particles.

In some embodiments, a piezoelectric depositor is used at block 312 to control the location of the particles. In some embodiments, the piezoelectric depositor can be controlled to provide control for patterning of the particles. In some embodiments, a template such as, but not limited to, a metal plate or the like, can be used to provide a template for patterning of the particles.

At block 314, the method includes forming a roofing shingle from the asphalt coated substrate having the plurality of particles and the plurality of granules as deposited. Block 314 can include one or more additional steps. For example, in some embodiments, block 314 can include pressing layers of the roofing shingle together or the like.

The terminology used herein is intended to describe embodiments and is not intended to be limiting. The terms “a,” “an,” and “the” include the plural forms as well, unless clearly indicated otherwise. The terms “comprises” and/or “comprising,” when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A method comprising:

obtaining a glass mat substrate having a first side and a second side opposite the first side;

coating the first side of the glass mat substrate with a molten asphalt to obtain an asphalt coated substrate;

obtaining a plurality of fines;

obtaining a plurality of roofing granules;

using an electrostatic generator to deposit the plurality of fines in a first location on the first side of the asphalt coated substrate;

wherein the first location is a nail zone;

after depositing the plurality of fines, depositing the plurality of granules in a second location on the first side of the asphalt coated substrate, wherein the second location is different from the first location; and forming a roofing shingle from the asphalt coated substrate.

2. The method of claim 1, wherein the plurality of fines includes mineral particles, polymeric particles, or any combination thereof.

3. The method of claim 1, further comprising depositing the plurality of granules on the first side of the asphalt coated substrate using a gravity feed.

* * * * *